United States Patent
Taki et al.

(10) Patent No.: US 10,896,293 B2
(45) Date of Patent: Jan. 19, 2021

(54) INFORMATION PROCESSING APPARATUS AND INFORMATION PROCESSING METHOD

(71) Applicant: SONY CORPORATION, Tokyo (JP)

(72) Inventors: Yuhei Taki, Kanagawa (JP); Shinichi Kawano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 184 days.

(21) Appl. No.: 16/095,502

(22) PCT Filed: Apr. 19, 2017

(86) PCT No.: PCT/JP2017/015781
§ 371 (c)(1),
(2) Date: Oct. 22, 2018

(87) PCT Pub. No.: WO2018/020759
PCT Pub. Date: Feb. 1, 2018

(65) Prior Publication Data
US 2019/0129936 A1 May 2, 2019

(30) Foreign Application Priority Data

Jul. 26, 2016 (JP) .................. 2016-146307

(51) Int. Cl.
| | |
|---|---|
| *G10L 15/00* | (2013.01) |
| *G06F 40/289* | (2020.01) |
| *G06F 3/16* | (2006.01) |
| *G06F 40/232* | (2020.01) |
| *G06F 40/268* | (2020.01) |
| *G06F 40/284* | (2020.01) |
| *G10L 15/26* | (2006.01) |

(52) U.S. Cl.
CPC .............. *G06F 40/289* (2020.01); *G06F 3/16* (2013.01); *G06F 40/232* (2020.01); *G06F 40/268* (2020.01); *G06F 40/284* (2020.01); *G10L 15/26* (2013.01)

(58) Field of Classification Search
CPC .............. G10L 15/08; G10L 2015/086; G10L 2015/088; G10L 15/22; G10L 2015/225; G10L 15/26
See application file for complete search history.

(56) References Cited

U.S. PATENT DOCUMENTS

| | | | | |
|---|---|---|---|---|
| 7,216,077 | B1 * | 5/2007 | Padmanabhan | G10L 15/065 704/240 |
| 7,698,326 | B2 * | 4/2010 | Thorn | G06F 40/274 707/705 |
| 8,249,869 | B2 * | 8/2012 | Vessiere | G06F 40/232 704/235 |
| 2002/0052742 | A1 * | 5/2002 | Thrasher | G10L 15/083 704/251 |

(Continued)

*Primary Examiner* — Edgar X Guerra-Erazo
(74) *Attorney, Agent, or Firm* — Paratus Law Group, PLLC

(57) ABSTRACT

Provided is an information processing apparatus including a processing unit configured to determine, on a basis of a word of a predetermined unit selected in a text string indicated by text string information, another word connected to the selected word and included in the text string and to set a delimitation in the text string with regard to the selected word.

16 Claims, 7 Drawing Sheets

(56) References Cited

U.S. PATENT DOCUMENTS

| | | | |
|---|---|---|---|
| 2002/0091520 A1* | 7/2002 | Endo | G10L 15/19 |
| | | | 704/235 |
| 2003/0104839 A1* | 6/2003 | Kraft | H04M 1/2748 |
| | | | 455/566 |
| 2005/0203751 A1* | 9/2005 | Stevens | G10L 15/22 |
| | | | 704/276 |
| 2007/0100635 A1* | 5/2007 | Mahajan | G10L 15/22 |
| | | | 704/276 |
| 2008/0126314 A1* | 5/2008 | Thorn | H04L 61/30 |
| 2009/0326938 A1* | 12/2009 | Marila | G10L 15/22 |
| | | | 704/235 |
| 2010/0161312 A1* | 6/2010 | Vessiere | G06F 40/232 |
| | | | 704/9 |

* cited by examiner

FIG. 1

| I | bought | a car | soup |

FIG. 2

A → I bought a car [soup]

B → I bought a [car] soup

C → I bought [a car] soup

FIG. 3

| Target | COOCCURRENCE RELATION WORD (COOCCURRENCE WORD) | CONNECTION DIRECTION | INTENSITY (COOCCURRENCE INTENSITY) |
|---|---|---|---|
| Get | Old | BACK | 0.8 |
| | Rid of | BACK | 0.7 |
| | Along | BACK | 0.7 |
| | Along with | BACK | 0.4 |
| | to | FRONT | 0.4 |
| | ⋮ | | |

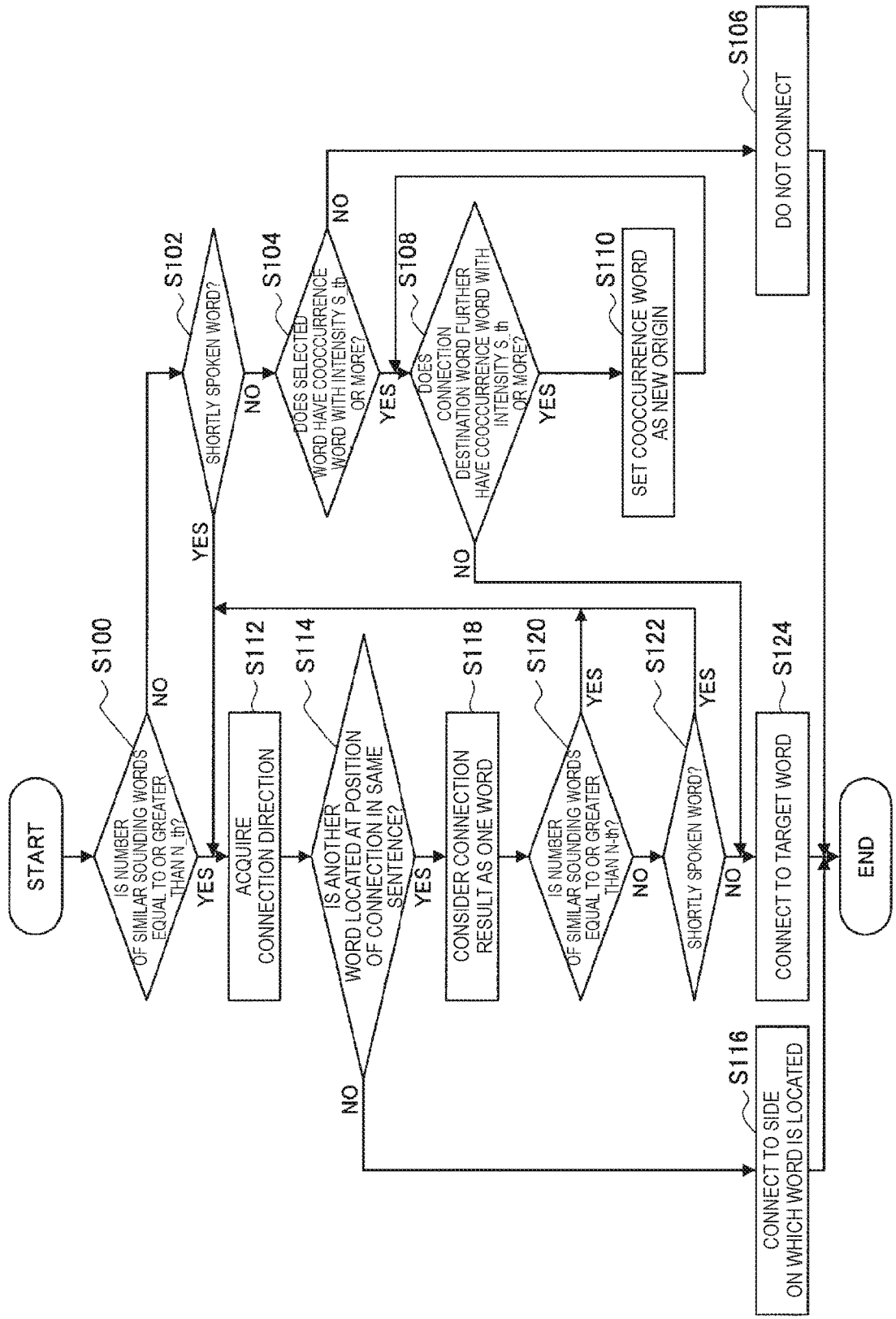

FIG. 5

A → I have no idea what's [going on]
B → I have no idea what's [going] on
C → I have no idea [what's] going on
D → I have no [idea] what's going on
E → I have [no idea] what's going on
F → I [have] no idea what's going on
G → [I have] no idea what's going on

FIG. 6

A → I have no idea [what's] going on

B →
I have [no idea] what's going on
or
I have no [idea] what's going on

C → I have [no idea] what's going on

FIG. 7

A → I have no idea <u>what's</u> going on
B → I have no <u>idea</u> what's going on
C → I have <u>no idea</u> what's going on

FIG. 8

A → What's your [dream] team?
B → What's [your dream] team?

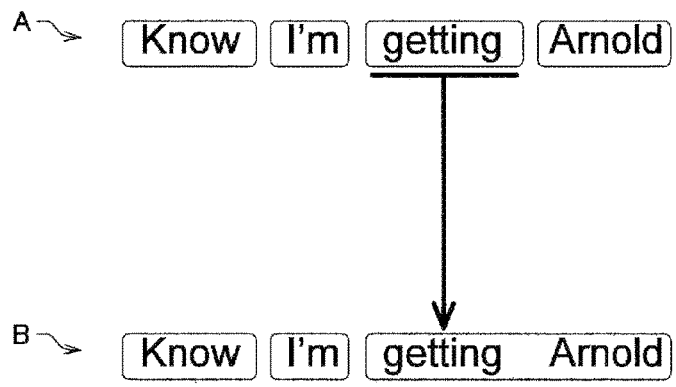

FIG. 17

```
Result OBJECT :
Ex. json FORMAT
{
    "input": "I am a party monster"
    "analysis":
    {
        [
            {
                "word": "I",
                "NeedCombined": false,
                "WhichDirection": ""
            },
            ...
        ]
    }
}
```

INFORMATION PROCESSING APPARATUS AND INFORMATION PROCESSING METHOD

CROSS REFERENCE TO PRIOR APPLICATION

This application is a National Stage Patent Application of PCT International Patent Application No. PCT/JP2017/015781 (filed on Apr. 19, 2017) under 35 U.S.C. § 371, which claims priority to Japanese Patent Application No. 2016-146307 (filed on Jul. 26, 2016), which are all hereby incorporated by reference in their entirety.

TECHNICAL FIELD

The present disclosure relates to an information processing apparatus and an information processing method.

BACKGROUND ART

There are schemes for cutting words from a text string using morphological analysis. As a technology using such a scheme, for example, a technology disclosed in Patent Literature 1 below can be exemplified.

CITATION LIST

Patent Literature

Patent Literature 1: JP H11-296193A

DISCLOSURE OF INVENTION

Technical Problem

When a text string is input in accordance with any method such as an input by voice or an input using a manipulation device, an inputter who performs an input or a person other than the inputter desires to change the text string in some cases. The input text string is changed, for example, to correct an error of the input text string, convert the input text string, or the like. Hereinafter, a person who changes the input text string is referred to as a "user" for convenience.

Here, as one scheme for changing the input text string, for example, a scheme of delimiting the input text string into clauses and enabling a change in a delimited clause unit is considered. By enabling the change in the foregoing clause unit, a user can change the text string in the clause unit, and thus can delete the text string in the clause unit.

However, in a case in which the input text string is delimited by fixed delimitation such as a clause as in the foregoing scheme, for example, as will be described below, the user may not be able to perform a desired change in the text string since the delimitation is fixed in some cases.

The present disclosure proposes a novel or improved information processing apparatus and a novel and improved information processing method capable of achieving an improvement in convenience of a change in a text string.

Solution to Problem

According to the present disclosure, there is provided an information processing apparatus including a processing unit configured to determine, on the basis of a word of a predetermined unit selected in a text string indicated by text string information, another word connected to the selected word and included in the text string and to set a delimitation in the text string with regard to the selected word.

In addition, according to the present disclosure, there is provided an information processing method performed by an information processing apparatus, the information processing method including a step of determining, on the basis of a word of a predetermined unit selected in a text string indicated by text string information, another word connected to the selected word and included in the text string and setting a delimitation in the text string with regard to the selected word.

Advantageous Effects of Invention

According to the present disclosure, it is possible to achieve an improvement in convenience of a change in a text string.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is an explanatory diagram illustrating an overview of an information processing method according to the present embodiment.

FIG. 2 is an explanatory diagram illustrating an overview of an information processing method according to the present embodiment.

FIG. 3 is an explanatory diagram illustrating an example of a process related to the information processing method according to the present embodiment.

FIG. 4 is a flowchart illustrating an example of a setting process related to the information processing method according to the present embodiment.

FIG. 5 is an explanatory diagram illustrating a first display example of a display control process related to the information processing method according to the present embodiment.

FIG. 6 is an explanatory diagram illustrating a second display example of a display control process related to the information processing method according to the present embodiment.

FIG. 7 is an explanatory diagram illustrating a third display example of a display control process related to the information processing method according to the present embodiment.

FIG. 8 is an explanatory diagram illustrating a fourth display example of a display control process related to the information processing method according to the present embodiment.

FIG. 9 is an explanatory diagram illustrating a fifth display example of a display control process related to the information processing method according to the present embodiment.

FIG. 10 is an explanatory diagram illustrating a sixth display example of a display control process related to the information processing method according to the present embodiment.

FIG. 11 is an explanatory diagram illustrating a seventh display example of a display control process related to the information processing method according to the present embodiment.

FIG. 12 is an explanatory diagram illustrating the seventh display example of a display control process related to the information processing method according to the present embodiment.

FIG. 13 is an explanatory diagram illustrating an eighth display example of a display control process related to the information processing method according to the present embodiment.

FIG. 17 is an explanatory diagram illustrating an example of a program causing a computer system to function as the information processing apparatus according to the present embodiment.

MODE(S) FOR CARRYING OUT THE INVENTION

Figure 14:
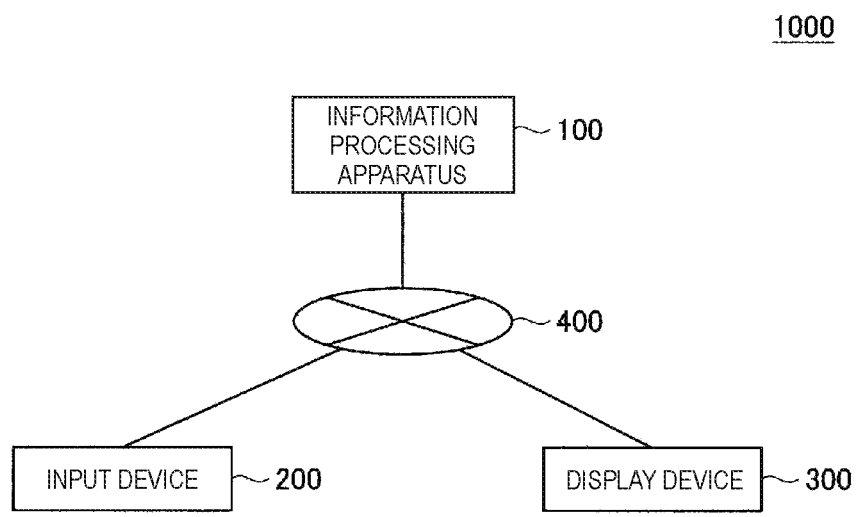
FIG. 14 is an explanatory diagram illustrating an example of an information processing system according to the present embodiment including the information processing apparatus according to the present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the following description will proceed in the order described below.
1. Information processing method according to embodiment
2. Information processing apparatus according to embodiment
3. Program according to present embodiment Information Processing Method According to Present Embodiment First, an information processing method of the present embodiment will be described. A case in which a process according to an information processing method of the present embodiment is performed by an information processing apparatus according to the present embodiment will be described below as an example.
[1] Overview of Information Processing Method According to Present Embodiment In a case in which an input text string is delimited by a fixed delimitation as in the above-described scheme, a user may not be able to perform a desired a change in the text string since the delimitation is fixed in some cases.

FIG. 1 is an explanatory diagram illustrating an overview of an information processing method according to the present embodiment and illustrates an example in which the input text string is delimited into clauses.

FIG. 1 illustrates an example in which the text string obtained by performing a voice recognition process when "I bought a bar soup" is spoken is delimited as a clause. That is, FIG. 1 illustrates an example in which a text string (a text string indicated by a result of the voice recognition) obtained in accordance with an input by voice is delimited into clauses.

In addition, FIG. 1 illustrates an example in which a text string obtained in accordance with an input by voice is "I bought a car soup" and an error occurs in the part "car."

By delimiting the text string into the clauses, the text string illustrated in FIG. 1 is delimited into "I," "bought," "a car," and "soup." Here, the reason why "a car" is delimited in FIG. 1 is that, for example, in a case in which the user attempts to change "a" to "the" by voice, the voice is too short and an error easily occurs in the voice recognition. That is, the reason why "a car" is delimited in FIG. 1 is, for example, to improve precision of the voice recognition.

By delimiting the input text string into the clauses, as illustrated in FIG. 1, a change in a clause unit is possible. That is, in the example illustrated in FIG. 1, for example, the user can correct only the part "a car" including the error. Accordingly, when the input text string is delimited into the clauses, as illustrated in FIG. 1, there is a possibility of an improvement in convenience of a change in the text string being achieved.

In the example illustrated in FIG. 1, a case in which the user attempts to correct the part "car" which is erroneous in the part "a car" by voice will be assumed. In this case, the user says "a bar." Here, the part "a" in the part "a car" is a correctly recognized result.

However, in the case in which "a bar" is spoken to perform the foregoing correction, there is a possibility of the part "a" which is a correct result before the attempt to correct the part being erroneously recognized by the voice for the correction. In addition, as illustrated in FIG. 1, in a case in which the input text string is delimited by the fixed delimitation such as the clauses, the user may not be able to correct only the erroneous part "car."

Accordingly, as illustrated in FIG. 1, in a case in which the input text string is delimited by the fixed delimitation such as the clauses, the user may not be able to perform a desired change in the text string.

Accordingly, the information processing apparatus according to the present embodiment sets a delimitation in a text string indicated by text string information with regard to a word of a predetermined unit selected in the text string on the basis of the word.

The text string information according to the present embodiment is data indicating a text string.

As the text string indicated by the text string information according to the present embodiment, for example, "a text string obtained as a result of a voice recognition process of obtaining the text string (or text) indicating speech content from a voice signal (a digital signal or an analog signal) including voice spoken by a speaker," that is, "a text string indicated by the result of the voice recognition," can be exemplified. Ina case in which the text string information indicates the result of the voice recognition, the text string indicated by the text string information is equivalent to a text string indicating the spoken content.

Here, the voice signal including voice spoken by the speaker is generated by a voice input device such as a microphone. The voice input device may be a device included in the information processing apparatus according to the present embodiment or may be an external device of the information processing apparatus according to the present embodiment.

In addition, the voice recognition process may be performed by the information processing apparatus according to the present embodiment or may be performed by an external apparatus of the information processing apparatus according to the present embodiment.

In a case in which the information processing apparatus according to the present embodiment performs the voice recognition process, the information processing apparatus according to the present embodiment sets the text string information obtained through the voice recognition process as a target of a process related to an information processing method according to the present embodiment. In addition, in a case in which the voice recognition process is performed by an external apparatus, the information processing apparatus according to the present embodiment acquires the text string information generated by the external apparatus and sets the text string information as a target of the process related to the information processing method according to the present embodiment. The information processing apparatus according to the present embodiment acquires the text string information generated by the external apparatus, for example, by communicating with the external apparatus or reading the text string information from a recording medium on which the text string information is recorded.

Note that the text string indicated by the text string information according to the present embodiment is not limited to a text string indicated by a result of the voice recognition (a text string indicating spoken content).

For example, the text string indicated by the text string information according to the present embodiment may be a text string indicated by a result of an input to any manipulation device such as a keyboard (a hardware keyboard or a software keyboard). As the input to the manipulation device, for example, an input in accordance with any input method capable of performing an input to a manipulation device, such as an input using a limb or an input using a visual line, can be exemplified.

The manipulation device may be a device included in the information processing apparatus according to the present embodiment or may be an external device of the information processing apparatus according to the present embodiment.

In a case in which the manipulation device is included in the information processing apparatus according to the present embodiment, the information processing apparatus according to the present embodiment sets text string information obtained in response to a manipulation on the manipulation device as a target of a process related to the information processing method according to the present embodiment. In addition, in a case in which the manipulation device is an external device, the information processing apparatus according to the present embodiment acquires text string information generated by the external device and sets the text string information as a target of a process related to the information processing method according to the present embodiment. The information processing apparatus according to the present embodiment acquires the text string information generated by the external device, for example, by communicating with the external device or reading the text string information from a recording medium on which the text string information is recorded.

In addition, the text string indicated by the text string information according to the present embodiment may be a text string including both a text string indicated by a result of the voice recognition and a text string indicated by a result of an input to the manipulation device.

As the word of the predetermined unit according to the present embodiment, for example, a word of a unit in which a text string is delimited in accordance with any method, such as a unit in which a text string is delimited through clausal, word, phrasal, or morphological analysis or the like can be exemplified. Hereinafter, the word of the predetermined unit according to the present embodiment is simply referred to as a "word" in some cases.

In addition, the word according to the present embodiment is selected, for example by any method that can be used to select a word, such as a manipulation on a manipulation device which can be manipulated, a manipulation on a device on which display and a manipulation can be performed such as a touch panel, or a manipulation using a visual line. In addition, the selection of the word according to the present embodiment may be automatically performed by the information processing apparatus according to the present embodiment. As an example of the automatic selection, for example, "recognition of words forming a text string indicated by text string information when the information processing apparatus according to the present embodiment acquires the text string information and selection of each of the recognized words" can be exemplified.

FIG. 2 is an explanatory diagram illustrating an overview of the information processing method according to the present embodiment and illustrates an example in which an input text string is delimited on the basis of a word of a predetermined unit.

As in FIG. 1, FIG. 2 illustrates an example in which when "I bought a bar soup" is spoken and a voice recognition process is performed, a text string "I bought a car soup" in which an error occurs in the part "car" is obtained.

A of FIG. 2 illustrates an example of a delimitation set with regard to "soup" (an example of a word) in a case in which "soup" is selected. In addition, B of FIG. 2 illustrates an example of a delimitation set with regard to "car" (an example of a word) in a case in which "car" is selected. In addition, C of FIG. 2 illustrates an example of a delimitation set with regard to "a" (an example of a word) in a case in which "a" is selected.

As described above, the information processing apparatus according to the present embodiment sets a delimitation of a word on the basis of the word selected in the text string.

Accordingly, in a case in which the information processing method according to the present embodiment is used, as illustrated in B of FIG. 2 and C of FIG. 2, the delimitation to be set can be changed to the case in which "car" is selected and the case in which "a" is selected. That is, by using the information processing method according to the present embodiment, it is possible to dynamically change the delimitation to be set in the text string in accordance with the selected word.

In the example illustrated in FIG. 2, in the case in which "car" is selected, the part "car" is set as a delimitation. Therefore, the user can correct only an erroneous part included in the text string. In addition, in the example illustrated in FIG. 2, in the case in which "a" is selected, the part "a car" is set as a delimitation. Therefore, as in the example illustrated in FIG. 1, it is possible to improve precision of the voice recognition.

Accordingly, by using the information processing method according to the present embodiment, it is possible to achieve the improvement in the convenience of the change in the text string.

[2] Process Related to Information Processing Method According to Present Embodiment Next, a process related to the information processing method according to the present embodiment will be described more specifically.

The information processing apparatus according to the present embodiment performs a setting process and a display control process to be described below, for example, as the process related to the information processing method according to the present embodiment.

[2-1] Setting Process

On the basis of a word of a predetermined unit selected in a text string indicated by text string information, the information processing apparatus according to the present embodiment sets a delimitation in the text string with respect to a selected word.

The information processing apparatus according to the present embodiment sets the delimitation in the text string with regard to the selected word by determining another word connected to the selected word and included in the text string indicated by the text string information. Here, the connection of the plurality of words according to the present embodiment means, for example, that the plurality of words are considered to be one text string (a series of text strings).

More specifically, the information processing apparatus according to the present embodiment sets, for example, a text string formed by the selected word and the other word determined to be connected to the selected word as the delimitation with regard to the selected word.

For example, as described above, by setting the text string formed by the selected word and the other word determined to be connected to the selected word as the delimitation with regard to the selected word, it is possible to change the delimitation set in the text string indicated by the text string information in accordance with a determination result of the other word connected to the selected word.

Accordingly, by performing a setting process as the process related to the information processing method according to the present embodiment, the information processing apparatus according to the present embodiment can dynamically change a delimitation set in the text string in accordance with the selected word.

Hereinafter, an example of the setting process will be described while describing a process related to the determination of another word connected to the selected word.

The information processing apparatus according to the present embodiment determines another word connected to the selected word, for example, on the basis of a predetermined index (hereinafter referred to as a "predetermined index" or simply referred to as an "index") of the connection.

Here, as the predetermined index of the connection according to the present embodiment, for example, one or two or more of the number of similar sounding words, whether a word is spoken shortly, and a cooccurrence relation can be exemplified.

In the following description, the information processing apparatus according to the present embodiment performs, for example, any of a setting process in the following first example to a setting process in the following fifth example on the basis of the predetermined index, for example.

[2-1-1] First Example of Setting Process: Setting Process Using Number of Similar Sounding Words as Index The information processing apparatus according to the present embodiment determines another word connected to the selected word on the basis of the number of words that sound similar to the selected word.

Here, as similar sounding words according to the present embodiment, a word that sounds the same when spoken but has a different meaning thereinafter referred to as a "homophone") and a word that sounds similar when spoken but has a different meaning can be exemplified. As similar sounding words, "no," "know," "raw," "owe," and the like can be exemplified.

The information processing apparatus according to the present embodiment determines the other word connected to the selected word, for example, by comparing the number of words sounding similar to the selected word to a threshold of the similar sounding words.

The information processing apparatus according to the present embodiment specifies the number of words sounding similar to the selected word, for example, by specifying the similar sounding words associated with the selected word with reference to a table (or a database) in which words are associated with similar sounding words. The table in which words are associated with similar sounding words is stored in, for example, a recording medium such as a storage unit (which will be described below) included in the information processing apparatus according to the present embodiment or a an external recording medium of the information processing apparatus according to the present embodiment.

Here, as the threshold of the similar sounding words, for example, a fixed value which is set in advance and a variable value that is variable on the basis of a manipulation or the like by a user or the like of the information processing apparatus according to the present embodiment can be exemplified.

The information processing apparatus according to the present embodiment determines that the other word is connected to the selected word in a case in which the number of words sounding similar to the selected word is greater than the threshold of the similar sounding words (or a case in which the number of similar sounding words is equal to or greater than the threshold).

In addition, the information processing apparatus according to the present embodiment determines that the other word is not connected to the selected word in a case in which the number of words sounding similar to the selected word is equal to or less than the threshold of the similar sounding words (or a case in which the number of similar sounding words is less than the threshold).

In a case in which it is determined that the other word is connected to the selected word, the information processing apparatus according to the present embodiment specifies whether the selected word is connected to a word which is linguistically in the front of the text string or the selected word is connected to a word which is linguistically in the back of the text string. That is, in a case in which it is determined that the other word is connected to the selected word, the information processing apparatus according to the present embodiment specifies a connection direction.

Here, the word which is linguistically in the front with respect to the selected word according to the present embodiment is, for example, a word spoken earlier than the selected word when the text string is spoken. In addition, the word which is linguistically in the back with respect to the selected word according to the present embodiment is, for example, a word spoken later than the selected word when the text string is spoken. Note that the linguistic front and back according to the present embodiment can also be regulated in accordance with a description order when the text string is written.

For example, the information processing apparatus according to the present embodiment specifies the connection direction of the selected word, for example, by referring to a table (or a database) in which words are associated with connection directions. The table in which words are associated with connection directions is stored in, for example, a recording medium such as a storage unit (which will be described below) included in the information processing apparatus according to the present embodiment or an external recording medium of the information processing apparatus according to the present embodiment.

When the connection direction is specified, the information processing apparatus according to the present embodiment determines whether another word is located linguistically near in the specified connection direction in the text string when the selected word is set as a reference. As the word which is located linguistically near in the specified connection direction in the text string when the selected word is set as a reference, for example, a word spoken immediately before the selected word (an example in a case in which the connection direction is front) and a word spoken immediately after the selected word (an example in a case in which the connection direction is back) can be exemplified.

In a case in which it is determined that another word is located in the specified connection direction, the information processing apparatus according to the present embodiment determines the other word determined to be located in the specified connection direction as a word connected to the selected word. Then, the information processing apparatus according to the present embodiment sets the text string formed by the selected word and the determined "word (other word) connected to the selected word" as a delimitation of the selected word.

Conversely, for example, in a case in which it is determined that the other word is not located in the specified connection direction, the information processing apparatus according to the present embodiment determines that there is no other word connected to the selected word. In a case in which it is determined that there is no other word connected to the selected word, the information processing apparatus according to the present embodiment sets the selected word as a delimitation of the selected word.

Note that the process in the case in which it is determined that there is no other word in the specified connection direction is not limited to the foregoing example.

For example, in a case in which it is determined that the other word is not located in the specified connection direction, the information processing apparatus according to the present embodiment may determine the other word on the side on which it is located as the word connected to the selected word irrespective of the specified connection direction. In a case in which it is determined that the other word on the side on which it is located is the word connected to the selected word, the information processing apparatus according to the present embodiment sets a text string formed by the selected word and the determined "word (other word) connected to the selected word" as a delimitation of the selected word.

[2-1-2] Second Example of Setting Process: Setting Process of Setting Shortly Spoken Word as Index The information processing apparatus according to the present embodiment determines whether the selected word is a shortly spoken word and determines another word connected to the selected word.

As the shortly spoken word according to the present embodiment, a word corresponding to a short sound when a word is spoken can be exemplified. As the shortly spoken words, "a," "an," "the," "in," "of," and the like can be exemplified.

The information processing apparatus according to the present embodiment determines whether or not the selected word is a shortly spoken word, for example, by referring to a table (or a database) in which shortly spoken words are stored. The table in which the shortly spoken words are stored is stored in, for example, a recording medium such as a storage unit (Which will be described below) included in the information processing apparatus according to the present embodiment or a an external recording medium of the information processing apparatus according to the present embodiment.

That is, as the shortly spoken word according to the present embodiment, for example, words which are set in advance can be exemplified.

Note that the process of determining whether the selected word according to the present embodiment is a shortly spoken word is not limited to the process of using the table in which the shortly spoken words are stored. For example, the information processing apparatus according to the present embodiment may determine whether the selected word is a shortly spoken word by performing an arithmetic process of any algorithm capable of determining whether or not input words correspond to shortly spoken words, such as an arithmetic process of performing the determination on the basis of the number of letters of the input word.

In a case in which it is determined that the selected word is a shortly spoken word, the information processing apparatus according to the present embodiment determines that the other word is connected to the selected word.

Conversely, in a case in which it is determined that the selected word is not a short spoken word, the information processing apparatus according to the present embodiment determines that the other word is not connected to the selected word.

In a case in which it is determined that the other word is connected to the selected word, the information processing apparatus according to the present embodiment specifies a connection direction as in the setting process in the foregoing first example.

When the connection direction is specified, the information processing apparatus according to the present embodiment determines whether another word is located linguistically near in the specified connection direction in the text string when the selected word is set as a reference as in the setting process in the foregoing first example.

In a case in which it is determined that the other word is located in the specified connection direction as in the setting process in the foregoing first example, the information processing apparatus according to the present embodiment determines the other word determined to be located as a word connected to the selected word. Then, the information processing apparatus according to the present embodiment sets a text string formed by the selected word and the determined "word (the other word) connected to the selected word" as a delimitation of the selected word.

In addition, for example, in a case in which it is determined that the other word is not in the specified connection direction as in the setting process in the foregoing first example, the information processing apparatus according to the present embodiment determines that there is no other word connected to the selected word. In a case in which it is determined that there is no other word connected to the selected word, the information processing apparatus according to the present embodiment sets the selected word as a delimitation of the selected word.

Note that in the case in which it is determined that the other word is not located in the specified connection direction, the information processing apparatus according to the present embodiment may determine the other word on the located side as a word connected to the selected word irrespective of the specified connection direction as in the setting process of the foregoing first example.

[2-1-3] Third Example of Setting Process: Process of Setting Cooccurrence Relation as Index The information processing apparatus according to the present embodiment determines a cooccurrence relation with a cooccurrence word related to the selected word and determines another word connected to the selected word.

The cooccurrence word according to the present embodiment is, for example, a word which is frequently used in a sentence including a certain word. As the cooccurrence word related to the selected word, one or both of a cooccurrence word directly associated with the selected word and a cooccurrence word indirectly associated with the selected word can be exemplified. The cooccurrence word directly associated with the selected word is, for example, a word which is frequently used in a sentence including the selected word. In addition, the concurrence word indirectly associated with the selected word is, for example, a cooccurrence word directly associated with "the cooccurrence word directly associated" in a text string indicated by the text string information. As words which have a strong cooccurrence relation, "get," "take," "vice," "phrasal verb," and the like can be exemplified.

The information processing apparatus according to the present embodiment determines another word connected to the selected word, for example, by comparing a value indicating cooccurrence intensity of a cooccurrence word related to the selected word to a threshold of the cooccurrence relation.

Here, as the threshold of the cooccurrence relation, for example, a fixed value which is set in advance and a variable value which is variable on the basis of a manipulation or the like by a user or the like of the information processing apparatus according to the present embodiment can be exemplified.

The information processing apparatus according to the present embodiment specifies a cooccurrence word associated with selected word and a value indicating cooccurrence intensity of the cooccurrence word, for example, by referring to a table (or a database) which a word is associated with data related to cooccurrence words corresponding to the word.

FIG. 3 is an explanatory diagram illustrating an example of a process related to the information processing method according to the present embodiment and illustrates an example of a table in which a word "Get" is associated with data related to cooccurrence words corresponding to this word. Data indicated by each of a "cooccurrence relation word (cooccurrence word)," a "connection direction," and an "intensity (cooccurrence intensity)" illustrated in FIG. 3 corresponds to data related to the cooccurrence words corresponding to the word "Get" The value indicated by the "intensity (cooccurrence intensity)" illustrated in FIG. 3 may be a value obtained by any algorithm capable of obtaining a value indicating the cooccurrence relation or may be, for example, a value which is manually set on the basis of a manipulation or the like by a user or the like of the information processing apparatus according to the present embodiment. FIG. 3 illustrates an example in which the cooccurrence relation is stronger as the value indicated by the "intensity (cooccurrence intensity)" is larger.

For example, as illustrated in the "cooccurrence relation word (concurrence word)" in FIG. 3, a plurality of cooccurrence words can be associated with a word in the table in which a word is associated with data related to cooccurrence words corresponding to the word. In addition, for example, as illustrated in the "intensity (cooccurrence intensity)" in FIG. 3, a value indicating cooccurrence intensity is stored for each cooccurrence word in the table in which a word is associated with data related to cooccurrence words corresponding to the word.

As illustrated in FIG. 3, the table in which a word is associated with data related to cooccurrence words corresponding to the word is stored in, for example, a recording medium such as a storage unit (which will be described below) included in the information processing apparatus according to the present embodiment or a an external recording medium of the information processing apparatus according to the present embodiment. In addition, in the recording medium, for example, the table in which a word is associated with data related to cooccurrence words corresponding to the word is stored for each word.

Note that it is needless to say that the table in which a word is associated with data related to cooccurrence words corresponding to the word is not limited to the example illustrated in FIG. 3.

For example, "in a case in which a cooccurrence word related to the selected word is in other words included in the text string indicated by the text string information and a value indicating the cooccurrence intensity of the cooccurrence word is greater than the threshold related to the cooccurrence relation (or the value indicating the cooccurrence intensity is equal to or greater than the threshold)," the information processing apparatus according to the present embodiment determines that the other word which is a cooccurrence word is connected.

Conversely, in "a case in which the cooccurrence word related to the selected word is not in other words included in the text string indicated by the text string information" or "a case in which the value indicating the cooccurrence intensity of the cooccurrence word related to the selected word is equal to or less than the threshold related to the cooccurrence relation (or a case in which the number of similar sounding words is less than the threshold)," the information processing apparatus according to the present embodiment determines that the other word is not connected to the selected word.

In a case in which it is determined that the other word which is the cooccurrence word is connected to the selected word, the information processing apparatus according to the present embodiment specifies the connection direction of the other word which is the cooccurrence word of the selected word. The information processing apparatus according to the present embodiment specifies the connection direction of the other word which is the cooccurrence word of the selected word, for example, by referring to the table in which a word is associated with data related to cooccurrence words corresponding to the word, as illustrated in FIG. 3.

When the connection direction is specified, the information processing apparatus according to the present embodiment determines whether the other word which is the cooccurrence word is in the specified connection direction in the text string when the selected word is set as a reference.

In a case in which it is determined that there is the other word which is the cooccurrence word, the information processing apparatus according to the present embodiment determines the other word which is the cooccurrence word and is determined to be present as a word connected to the selected word. In addition, in a case in which one or two or more other words are further between the selected word and the other word which is the cooccurrence word, the information processing apparatus according to the present embodiment determines the other words which are further present as words connected to the selected word. Then, the information processing apparatus according to the present embodiment sets a text string formed by the selected word and the determined "words (the other words connected to the selected word" as a delimitation of the selected word.

Conversely, for example, in a case in which it is determined that there is no other word, the information processing apparatus according to the present embodiment determines that there is no other word connected to the selected word. In a case in which it is determined that there is no other word connected to the selected word, the information processing apparatus according to the present embodiment sets the selected word as a delimitation of the selected word.

[2-14] Fourth Example of Setting Process

The information processing apparatus according to the present embodiment determines another word connected to the selected word to determine another word connected to the selected word on the basis of two or more indexes among the number of similar sounding words, a shortly spoken word or not, and a cooccurrence relation.

As the setting process based on two or more indexes, for example, a process of combining two or more of the setting process in the foregoing first example to the setting process in the foregoing third example can be exemplified.

As the combined process, for example, a process of performing two or more of the setting process in the foregoing first example to the setting process in the foregoing third example in a predetermined order can be exemplified. As the predetermined order, for example, a preset order, a random order, or an order in accordance with a predetermined rule such as an order based on priority set in the setting process in each example can be exemplified.

In addition, as other examples of the setting process based on two or more indexes, for example, a process of determining whether another word is connected to the selected word in accordance with the degree of connection with the other word based on two or more indexes among the number of similar sounding words, a shortly spoken word or not, and a cooccurrence relation and determining the other word connected to the selected word can be exemplified. The degree of connection with the other word can be obtained, for example, by calculating any algorithm capable of obtaining a numerical value on the basis of two or more indexes among the number of similar sounding words, a shortly spoken word or not, and a cooccurrence relation.

The information processing apparatus according to the present embodiment determines whether or not another word is connected to the selected word, for example, by comparing the degree of connection to a threshold of the connection. In addition, the information processing apparatus according to the present embodiment determines another word connected to the selected word, for example, by specifying the connection direction as in the setting process in the foregoing first example.

[2-1-5] Fifth Example of Setting Process:

The setting process according to the present embodiment is not limited to the setting process in the foregoing first example to the setting process in the foregoing fourth example.

For example, in a case in which it is determined that another word is connected to the selected word through the setting process in the foregoing first example to the setting process in the foregoing fourth example, the information processing apparatus according to the present embodiment can also perform the following process (a) to process (c):

(a) the information processing apparatus according to the present embodiment considers the selected word and the other word determined to be connected as one word;

(b) the information processing apparatus according to the present embodiment determines still another word included in a text string connected to one word and sets a delimitation of the selected word; and (c) in a case in which it is determined in the foregoing process (b) that still the other word is connected, the foregoing process (a) and the foregoing process (b) are further performed.

For example, by performing the setting process in the foregoing fifth example, it is possible to further increase the number of other words connected to the selected word than in the case in which the setting process in the foregoing first example to the setting process in the foregoing fourth example are performed. Accordingly, for example, by performing the setting process in the foregoing fifth example, it is possible to further diversify a delimitation set in accordance with the selected word than in the case in which the setting process in the foregoing first example to the setting process in the foregoing fourth example are performed.

The information processing apparatus according to the present embodiment sets a delimitation in the text string with regard to the selected word, for example, by performing any of the setting process in the foregoing first example to the setting process in the foregoing fifth example.

FIG. 4 is a flowchart illustrating an example of a setting process related to the information processing method according to the present embodiment. FIG. 4 illustrates an example of the setting process in the foregoing fifth example (an example of the setting process in the fifth example in which the setting process in the foregoing fourth example is used). The process illustrated in FIG. 4 is performed, for example, whenever a word is selected from a text string indicated by the text string information.

The information processing apparatus according to the present embodiment determines whether or not the number of sounding words similar to the selected word is equal to or greater than a threshold N_th (an example of a threshold of the similar sounding words) (S100). The determination in step S100 corresponds to the determination in the setting process in the foregoing first example.

In a case in which it is determined in step S100 that the number of sounding words similar to the selected word is not equal to or greater than the threshold N_th, the information processing apparatus according to the present embodiment determines whether the selected word is a shortly spoken word (S102). The determination in step S102 corresponds to the determination in the setting process in the foregoing second example.

In a case in which it is determined in step S102 that the selected word is the shortly spoken word, the information processing apparatus according to the present embodiment performs a process of step S112 to be described below.

Conversely, in a case in which it is determined in step S102 that the selected word is not the shortly spoken word, the information processing apparatus according to the present embodiment determines whether or not the selected word has a cooccurrence word with intensity S_th or more (an example of a threshold of the cooccurrence relation) (S104). The determination in step S104 corresponds to the determination in the setting process in the foregoing third example.

In a case in which it is determined in step S104 that the selected word does not have the cooccurrence word with the intensity S_th or more, the information processing apparatus according to the present embodiment does not connect the other word to the selected word (S106). Then, the information processing apparatus according to the present embodiment ends the process illustrated in FIG. 4.

Conversely, in a case in which it is determined in step S104 that the selected word does not have the cooccurrence word with the intensity S_th or more, the information processing apparatus according to the present embodiment determines whether or not the cooccurrence word which is a connection destination word further has a cooccurrence word with the intensity S_th or more (S108). The information processing apparatus according to the present embodiment performs a process similar to step S104 using the cooccurrence word which is the connection destination word as an origin.

In a case in which it is determined in step S108 that the selected word has the cooccurrence word with the intensity S_th or more, the information processing apparatus according to the present embodiment sets the cooccurrence word as a new origin (S110) and performs the process of step S108 again.

Conversely, in a case in which it is determined in step S108 that the selected word does not have the cooccurrence word with the intensity S_th or more, the information processing apparatus according to the present embodiment connects the selected word to the cooccurrence word determined in step S108 (S124). Then, the information processing apparatus according to the present embodiment ends the process illustrated in FIG. 4.

In a case in which it determined in step S100 that the number of sounding words similar to the selected word is equal to or greater than the threshold N_th or more or a case in which it is determined in step S102 that the selected word is the shortly spoken word, the information processing apparatus according to the present embodiment acquires the connection direction (S112). The information processing apparatus according to the present embodiment specifies the connection direction, for example, by referring to the table in which words are associated with connection directions, as described in the setting process in the foregoing first example.

When the process of step S112 is performed, the information processing apparatus according to the present embodiment determines whether or not another word is located in the connection direction in the same sentence (in the text string indicated by the text string information) (S114).

In a case in which it is determined in step S114 that the other word is not located in the connection direction, the information processing apparatus according to the present embodiment connects the other word on the located side to the selected word irrespective of the specified connection direction (S116). Then, the information processing apparatus according to the present embodiment ends the process illustrated in FIG. 4.

Conversely, in a case in which it is determined in step S114 that the other word is located in the connection direction, the information processing apparatus according to the present embodiment considers a connection result (the selected word and the other word determined to be connected) as one word (S118).

When the process of step S118 is performed, the information processing apparatus according to the present embodiment determines whether or not the number of sounding words similar to the considered one word is equal to or greater than the threshold N_th as in step S100 (S120).

In a case in which it is determined in step S120 that the number of sounding words similar to the considered one word is equal to or greater than the threshold N_th, the information processing apparatus according to the present embodiment sets the considered one word as a processing target and repeats the process from step S112.

Conversely, in a case in which it is determined in step S120 that the number of sounding words similar to the considered one word is not equal to or greater than the threshold N_th, the information processing apparatus according to the present embodiment determines whether the considered one word is a shortly spoken word as in step S102 (S122).

In a case in which it is determined in step S122 that the considered one word is the shortly spoken word, the information processing apparatus according to the present embodiment sets the considered one word as a processing target and repeats the process from step S112.

Conversely, in a case in which it is determined in step S122 that the considered one word is not the shortly spoken word, the information processing apparatus according to the present embodiment connects the selected word to the other word determined to he connected (S124). The process of step S124 in this case corresponds to a process of finalizing the considered one word in step S118 as a connection result. Then, the information processing apparatus according to the present embodiment ends the process illustrated in FIG. 4.

The information processing apparatus according to the present embodiment performs, for example, the process illustrated in FIG. 4 as the setting process.

Note that the setting process is not limited to the example illustrated in FIG. 4. For example, FIG. 4 illustrates the example of the setting process of using the number of similar sounding words, the shortly spoken word or not, and the cooccurrence relation as the predetermined indexes. However, as described above, the information processing apparatus according to the present embodiment can perform "a setting process of using one or two or more of the number of similar sounding words, the shortly spoken word or not, and the cooccurrence relation as the predetermined indexes." In addition, as described above, the information processing apparatus according to the present embodiment may perform a setting process in an order which is set in advance or an order in accordance with a predetermined rule.

[2-2] Display Control Process

The information processing apparatus according to the present embodiment causes a delimitation set with regard to a selected word to be displayed.

For example, the information processing apparatus according to the present embodiment causes a delimitation set with regard to a selected word to be displayed on a display screen of a display device. The display device may be a device included in the information processing apparatus according to the present embodiment or may be an external device of the information processing apparatus according to the present embodiment.

The information processing apparatus according to the present embodiment causes the delimitation set with regard to the selected word to be displayed, for example, by transmitting a control signal including data indicating a display command and display content to the display device. The control signal is transmitted, for example, via a communication device included in the information processing apparatus according to the present embodiment or an external communication device connected to the information processing apparatus according to the present embodiment.

As described above, when the information processing apparatus according to the present embodiment causes the delimitation set with regard to the selected word to be displayed, for example, a user or the like is visually notified of the delimitation set with regard to the selected word.

Note that content caused to be displayed by the information processing apparatus according to the present embodiment is not limited to the delimitation set with regard to the selected word.

For example, the information processing apparatus according to the present embodiment may cause a conversion candidate corresponding to the set delimitation to be further displayed. The information processing apparatus according to the present embodiment causes the conversion candidate corresponding to the set delimitation to be displayed, for example, by transmitting a control signal including data indicating a display command and display content to the display device.

Here, as the conversion candidate according to the present embodiment, for example, similar sounding words of the same language, a translated sentence of a different language, a pictograph, an abbreviation, a combination of two or more thereof, and the like can be exemplified.

Hereinafter, display examples through a display control process will be given. Hereinafter, a case in which a language of a text string indicated by the text information is English will be exemplified. Note that a language to which the process related to the information processing method according to the present embodiment can be applied is not limited to English. The process related to the information processing method according to the present embodiment can be applied to, for example, any language such as Japanese, German, French, Spanish, or Chinese.

[2-2-1] First Display Example in Display Control Process

FIG. 5 is an explanatory diagram illustrating a first display example of a display control process related to the information processing method according to the present embodiment. FIG. 5 illustrates an example in which the text string indicated by the text string information obtained in accordance with an input by voice or the like is "I have no idea what's going on."

A of FIG. 5 illustrates an example of a delimitation set with regard to "on" (an example of a word) in a case in which "on" is selected. A of FIG. 5 illustrates an example in which "going on" is set as a delimitation by determining that the selected "on" is a shortly spoken word.

B of FIG. 5 illustrates an example of a delimitation set with regard to "going" (an example of a word) in a case in which "going" is selected. B of FIG. 5 illustrates an example in which "going" is set as a delimitation without determining that the selected "going" is connected to another word.

C of FIG. 5 illustrates an example of a delimitation set with regard to "what's" (an example of a word) in a case in which "what's" is selected. C of FIG. 5 illustrates an example in which "what's" is set as a delimitation without determining that the selected "what's" is connected to another word.

D of FIG. 5 illustrates an example of a delimitation set with regard to "idea" (an example of a word) in a case in which "idea" is selected. D of FIG. 5 illustrates an example in which "idea" is set as a delimitation without determining that the selected "idea" is connected to another word.

E of FIG. 5 illustrates an example of a delimitation set with regard to "no" (an example of a word) in a case in which "no" is selected. E of FIG. 5 illustrates an example in which "no idea" is set as a delimitation by determining the selected "no" on the basis of the number of similar sounding words. Note that "no idea" can be set as the delimitation by determining that the selected "no" is, for example, a shortly spoken word.

F of FIG. 5 illustrates an example of a delimitation set with regard to "have" (an example of a word) in a case in which "have" is selected. F of FIG. 5 illustrates an example in which "have" is set as a delimitation without determining that the selected "have" is connected to another word.

G of FIG. 5 illustrates an example of a delimitation set with regard to "I" (an example of a word) in a case in which "I" is selected. G of FIG. 5 illustrates an example in which "I have" is set as a delimitation by determining that the selected "I" is a shortly spoken word.

For example, as illustrated in A of FIG. 5 to G of FIG. 5, the information processing apparatus according to the present embodiment causes the delimitation set for each of the selected words in the setting process to be displayed by a frame line.

Here, for example, as illustrated in A of FIG. 5, in a case in which a short word such as "on" is selected, the information processing apparatus according to the present embodiment can set a delimitation which is easier to change, such as "going on" and cause the delimitation to be displayed. In addition, for example, as illustrated in E of FIG. 5, in a case in which a word (for example, "know" corresponds to a homophone) for which there is a homophone such as "no" is selected, the information processing apparatus according to the present embodiment can set a delimitation which is easier to change, such as "no idea" and cause the delimitation to be displayed.

Accordingly, by performing the display, as illustrated in FIG. 5, it is possible to improve the convenience of the change in the text string.

[2-2-2] Second Display Example in Display Control Process

FIG. 6 is an explanatory diagram illustrating a second display example of the display control process related to the information processing method according to the present embodiment. FIG. 6 illustrates an example in which the text string indicated by the text string information is "I have no idea what's going on" as in the example illustrated in FIG. 5.

A of FIG. 6 illustrates an example of a delimitation set with regard to "what's" (an example of a word) in a case in which "what's" is selected. A of FIG. 6 illustrates an example in which "what's" is set as a delimitation without determining that the selected "what's" is connected to another word.

B of FIG. 6 illustrates an example of a delimitation set with regard to "idea" example of a word) in a case in which "idea" is selected. B of FIG. 6 illustrates an example in which "idea" is set as a delimitation without determining that the selected "idea" is connected to another word.

C of FIG. 6 illustrates an example of a delimitation set with regard to "no" (an example of a word) in a case in which "no" is selected. C of FIG. 6 illustrates an example in which "no idea" is set as a delimitation by determining the selected "no" on the basis of the number of similar sounding words or the like.

For example, as illustrated in B of FIG. 6, in a case in which the selected word is a word connected to another word when the other word is selected, the information processing apparatus according to the present embodiment may cause the connection to the other word to be clarified.

Here, B of FIG. 6 illustrates an example in which the connection to the other word is caused to be clarified by attaching a color or adding or an underline. Note that it is needless to say that the display method of clarifying connection to another word is not limited to the example illustrated in FIG. 6.

[2-2-3] Third Display Example in Display Control Process

FIG. 7 is an explanatory diagram illustrating a third display example of the display control process related to the information processing method according to the present embodiment. FIG. 7 illustrates an example in which the text string indicated by the text string information is "I have no idea what's going on" as in the example illustrated in FIG. 5.

A of FIG. 7 illustrates an example of a delimitation set with regard to "what's" (an example of a word) in a case in which "what's" is selected. A of FIG. 7 illustrates an example in which "what's" is set as a delimitation without determining that the selected "what's" is connected to another word.

B of FIG. 7 illustrates an example of a delimitation set with regard to "idea" (an example of a word) in a case in which "idea" is selected. B of FIG. 7 illustrates an example in which "idea" is set as a delimitation without determining that the selected "idea" is connected to another word.

C of FIG. 7 illustrates an example of a delimitation set with regard to "no" (an example of a word) in a case in which "no" is selected. C of FIG. 7 illustrates an example in which "no idea" is set as a delimitation by determining the selected "no" on the basis of the number of similar sounding words or the like.

For example, as illustrated in FIG. 7, the information processing apparatus according to the present embodiment can cause the set delimitation to be displayed with an underline.

Note that the display method of causing the set delimitation to be displayed is not limited to the frame line illustrated in FIG. 5 or the underline illustrated in FIG. 7. The information processing apparatus according to the present embodiment can cause the set delimitation to be displayed in accordance with any display method capable of causing the set delimitation to be clarified, such as attaching of a color.

[2-2-4] Fourth Display Example in Display Control Process

An example of display in a case in which a delimitation is set on the basis of an index such as a shortly spoken word will be described as a fourth display example.

FIG. 8 is an explanatory diagram illustrating a fourth display example of the display control process related to the information processing method according to the present embodiment. FIG. 8 illustrates an example in which a text string indicated by text string information obtained in accordance with an input by voice is "What's your dream team?."

A of FIG. 8 illustrates an example of a delimitation set with regard to "dream" (an example of a word) in a case in which "dream" is selected. A of FIG. 8 illustrates an example in which "dream" is set as a delimitation without determining that the selected "dream" is connected to another word.

B of FIG. 8 illustrates an example of a delimitation set with regard to "your" example of a word) in a case in which "your" is selected. B of FIG. 8 illustrates an example in which "your dream" is set as a delimitation by determining that the selected "your" is a shortly spoken word.

The possessive form such as "your" and the article such as "a" or "the" is a word related to a word continuing linguistically backwards. Accordingly, as in B of FIG. 8, the information processing apparatus according to the present embodiment determines that "yours" is connected to "dream" continuing backwards and sets "your dream" as a delimitation.

[2-2-5] Fifth Display Example in Display Control Process

An example of display in a case in which a delimitation is set on the basis of an index such as a cooccurrence relation will be described as a fifth display example.

FIG. 9 is an explanatory diagram illustrating a fifth display example of the display control process related to the information processing method according to the present embodiment. FIG. 9 illustrates an example of a case in which text string information indicating a text string in which the part "Arnold" erroneously occurs in "Know I'm getting Arnold" is acquired when "Know I'm getting old" is spoken and a voice recognition process is performed.

A of FIG. 9 illustrates an example of display in a case in which the text string indicated by the text string information is delimitated as a clause.

B of FIG. 9 illustrates an example of a delimitation set with regard to "getting" (an example of a word) in a case in which "getting" is selected. B of FIG. 9 illustrates an example in which "getting Arnold" is set as a delimitation by determining the selected "getting" on the basis of the cooccurrence relation.

For example, as illustrated in A of FIG. 9, when a case in which the part "Arnold" in which an error occurs is corrected by voice at the time of a delimitation of the text string is assumed, a user says only the part "Arnold" in which the error occurs. On the other hand, as illustrated in B of FIG. 9, when a case in which the part "Arnold" having an error is corrected by voice at the time of a delimitation of "getting Arnold" is assumed, a user says only the part "getting Arnold" having the error.

Here, in a case in which a word that has a strong cooccurrence relation with another word such as "getting" which is the word determined on the basis of the cooccurrence relation is included in a speech, it is possible to improve a possibility of a more correct voice recognition result being obtained, for example, by using the cooccurrence relation in the voice recognition process for a speech made for the correction. Accordingly, by displaying the delimitation set by the determination based on the cooccurrence relation, as illustrated in B of FIG. 9, it is possible to improve the convenience of the change in the text string.

[2-2-6] Sixth Display Example in Display Control Process

Another example of display in a case in which a delimitation is set on the basis of an index such as a cooccurrence relation will be described as a sixth display example.

FIG. 10 is an explanatory diagram illustrating a sixth display example of the display control process related to the information processing method according to the present embodiment. FIG. 10 illustrates an example in which the text string indicated by the text string information is "I have no idea what's going on" as in the example illustrated in FIG. 5.

A of FIG. 10 illustrates an example of a delimitation set with regard to "going" (an example of a word) or "what's" (an example of a word), for example, in a case in which "going" or "what's" is selected. A of FIG. 10 illustrates an example in which "what's going on" is set as a delimitation by determining the selected "going" or "what's" on the basis of the cooccurrence relation.

B of FIG. 10 illustrates an example of a delimitation set with regard to "idea" (an example of a word), for example, in a case in which "idea" is selected. B of FIG. 10 illustrates an example in which "I have no idea" is set as a delimitation by determining the selected "idea" on the basis of the cooccurrence relation.

For example, as illustrated in FIG. 10, the information processing apparatus according to the present embodiment can set a delimitation including three or more words and display the set delimitation.

[2-2-7] Seventh Display Example in Display Control Process

An example of display in a case in which a conversion candidate corresponding to a set delimitation is caused to be displayed will be described as a seventh display example. In the seventh display example, an example in which pictographs are displayed as conversion candidates corresponding to a set delimitation will be described.

FIGS. 11 and 12 are explanatory diagrams illustrating a seventh display example of the display control process related to the information processing method according to the present embodiment. FIGS. 11 and 12 illustrate examples in which the text string indicated by the text string information is "I have no idea what's going on" as in the example illustrated in FIG. 5.

FIG. 11 illustrates an example of a case in which the conversion candidates are displayed when a delimitation is set for each of the selected words. FIG. 12 illustrates an example of a case in which the conversion candidates are displayed when a delimitation is set so that another word is connected to the selected word.

In the examples illustrated in FIGS. 11 and 12, the text string included in the set delimitation is exchanged with a conversion candidate when a user selects the displayed conversion candidate.

A of FIG. 11 illustrates an example of a delimitation set with regard to "idea" (an example of a word) in a case in which "idea" is selected. A of FIG. 11 illustrates an example in which "idea" is set as a delimitation without determining that the selected "idea" is connected to another word.

B of FIG. 11 illustrates an example of a delimitation set with regard to "no" (an example of a word) in a case in which "no" is selected. Here, B of FIG. 11 is an example of a case in which it is determined that the selected "no" is not connected to another word and "no" is assumed to be set as a delimitation.

As illustrated in FIG. 11, in a case in which "idea" is selected at the time of setting of the delimitation, the information processing apparatus according to the present embodiment causes the pictograph corresponding to the selected "idea" to be displayed as a conversion candidate, as indicated by O1 of A of FIG. 11. In addition, as illustrated in FIG. 11, in a case in which "no" is selected at the time of setting the delimitation, the information processing apparatus according to the present embodiment causes the pictograph corresponding to the selected "no" to be displayed as a conversion candidate, as indicated by O2 of B of FIG. 11.

The information processing apparatus according to the present embodiment specifies the pictograph corresponding to the selected word, for example, by referring to a table (or a database) in which a text string is associated with a conversion candidate such as a pictograph or an abbreviation. Here, the information processing apparatus according to the present embodiment may change one or both of a kind and content of a conversion candidate to be specified in accordance with, for example, an executed application such as a chatting application. The table in which a text string is associated with a conversion candidate is stored in, for example, a recording medium such as a storage unit (which will be described below) included in the information processing apparatus according to the present embodiment or a an external recording medium of the information processing apparatus according to the present embodiment.

FIG. 12 illustrates an example of a delimitation set with regard to "no" (an example of a word) in a case in which "no" is selected. FIG. 12 illustrates an example in which "no idea" is set as a delimitation by determining the selected "no" on the basis of the number of similar sounding words or the like.

In a case in which "no" is selected at the time of setting of the delimitation, as illustrated in FIG. 12, the information processing apparatus according to the present embodiment causes a pictograph corresponding to the text string "no idea" included in the delimitation set with regard to the selected "no" to be displayed as a conversion candidate, as indicated by O of FIG. 12. The information processing apparatus according to the present embodiment specifies the pictograph corresponding to the text string included in the delimitation set with regard to the selected word, for example, by referring to the table in which a text string is associated with a conversion candidate.

As described above, the information processing apparatus according to the present embodiment can dynamically change the delimitation set in the text string in accordance with the selected word by performing the setting process. Accordingly, for example, as illustrated in FIG. 12, in a case in which a delimitation including a plurality of words is set, the information processing apparatus according to the present embodiment can cause pictographs (examples of conversion candidates) suitable for the text string and collected in the delimitation to be displayed, as indicated by O of FIG. 12. Note that it is needless to say that an example in which a pictograph is displayed as a conversion candidate corresponding to the set delimitation is not limited to the examples illustrated in FIGS. 11 and 12.

[2-2-8] Eighth Display Example in Display Control Process

Another example of display in a case in Which a conversion candidate corresponding to set delimitation is caused to be displayed will be described as an eighth display example. In the eighth display example, an example in which abbreviations are displayed as conversion candidates corresponding to a set delimitation will be described.

FIG. 13 is an explanatory diagram illustrating an eighth display example of the display control process related to the information processing method according to the present embodiment. A of FIG. 13 illustrates an example in which the text string indicated by the text string information is "This is good game." In addition, B of FIG. 13 illustrates an example in which the text string indicated by the text string information is "I should say laughing out loud."

In the example illustrated in FIG. 13, when a user selects the displayed conversion candidate, the text string included in the set delimitation is exchanged with a conversion candidate.

A of FIG. 13 illustrates an example of a delimitation set with regard to "good" (an example of a word), for example, in a case in which "good" is selected. A of FIG. 13 illustrates an example in which "good game" is set as a delimitation by determining the selected "good" on the basis of the cooccurrence relation.

In a case in which "good" is selected at the time of setting of the delimitation, as illustrated in A of FIG. 13, the information processing apparatus according to the present embodiment causes an abbreviation corresponding to the text string "good game" included in the delimitation set with regard to the selected "good" to be displayed as a conversion candidate, as indicated by O1 of A of FIG. 13. The information processing apparatus according to the present embodiment specifies the abbreviation corresponding to the text string included in the delimitation set with regard to the selected word, for example, by referring to the table in which a text string is associated with a conversion candidate. Here, the information processing apparatus according to the present embodiment may change one or both of a kind and content of the conversion candidate to be specified in accordance with, for example, an executed application.

B of FIG. 13 illustrates an example of a delimitation set with regard to "laughing" (an example of a word), for example, in a case in which "laughing" is selected. B of FIG. 13 illustrates an example in which "laughing out loud" is set as a delimitation by determining the selected "laughing" on the basis of the cooccurrence relation.

In a case in which "laughing" is selected at the time of setting of the delimitation, as illustrated in B of FIG. 13, the information processing apparatus according to the present embodiment causes the abbreviation corresponding to a text string "laughing out loud" included in the delimitation set with regard to the selected "laughing" to be displayed as a conversion candidate, as indicated by O2 of FIG. 13. The information processing apparatus according to the present embodiment specifies the abbreviation corresponding to the text string included in the delimitation set with regard to the selected word, for example, by referring to the table in which a text string is associated with a conversion candidate. Here, the information processing apparatus according to the present embodiment may change one or both of a kind and content of the conversion candidate to be specified in accordance with, for example, an executed application.

As described above, the information processing apparatus according to the present embodiment can dynamically change the delimitation set in the text string in accordance with the selected word by performing the setting process. Accordingly, for example, as illustrated in FIG. 13, in a case in which a delimitation including a plurality of words is set, the information processing apparatus according to the present embodiment can cause abbreviations (examples of conversion candidates) suitable for the text string and collected in the delimitation to be displayed, as indicated by O1 of A of FIG. 13 and O2 of B of FIG. 13. Note that it is needless to say that an example in which an abbreviation is displayed as a conversion candidate corresponding to the set delimitation is not limited to the examples illustrated in FIG. 13.

As the display example of the display control process, for example, the first example described in the foregoing [2-2-1] to the eighth example described in the foregoing [2-2-8] can be exemplified. Note that it is needless to say that the display example of the display control process is not limited to the above-describe examples.

The information processing apparatus according to the present embodiment performs, for example, the foregoing setting process and the foregoing display control process as the process related to the information processing method according to the present embodiment.

Here, by performing the foregoing setting process, it is possible to dynamically change the delimitation set in the text string in accordance with the selected word.

Accordingly, by performing the foregoing setting process, for example, as described above, it is possible to improve precision of the voice recognition.

In addition, by performing the foregoing display control process, it is possible to visually notify the set delimitation and further display the conversion candidates corresponding to the set delimitation.

Here, the delimitation set in accordance with the word selected in the foregoing setting process can be dynamically changed. Therefore, in a case in which the conversion candidates corresponding to the set delimitation are displayed, for example, as illustrated in FIGS. 12 and 13, it is possible to display the conversion candidates corresponding to the text string included in the delimitation set with regard to the selected word.

Accordingly, by performing, for example, the foregoing setting process and the foregoing display control process as the process related to the information processing method according to the present embodiment, it is possible to improve the convenience of the change in the text string.

In addition, by performing the foregoing setting process and the foregoing display control process as the process related to the information processing method according to the present embodiment, the following advantageous effects can be achieved. Note that it is needless to say that the advantageous effects achieved by performing the process related to the information processing method according to the present embodiment are not limited to the following advantageous effects:

it is possible to provide "a user interface (UI) for delimiting a text string so that a word for which there is no error as far as possible is not set to be a re-speaking target while utilizing "the connection to an adjacent word and an improvement in a recognition ratio" which is an advantage of a clause delimitation" by dynamically changing the delimitation; and a word can be connected using the cooccurrence relation since the delimitation can be set using the cooccurrence relation as an index. In a case in which a plurality of words are connected using the cooccurrence relation, there is a high possibility of the recognition ratio being improved in the voice recognition when a text string in which the plurality of words are connected is spoken. Therefore, it is possible to achieve an improvement in a correction rate of the result of the voice recognition.

Note that the process related to the information processing method according to the present embodiment is not limited to the foregoing setting process and the foregoing display control process.

For example, the information processing apparatus according to the present embodiment is also able not to perform the display control process as the process related to the information processing method according to the present embodiment. Even in a case in which the foregoing display control process is not performed, the information processing apparatus according to the present embodiment can dynamically change the delimitation set in the text string in accordance with the selected word through the setting process.

Accordingly, even in a case in which the foregoing display control process is not performed, it is possible to improve the convenience of the change in the text string.

Here, in a case in which the information processing apparatus according to the present embodiment does not perform the foregoing display control process, the foregoing display control process may be performed in an external device of the information processing apparatus according to the present embodiment. That is, the foregoing setting process and the foregoing display control process which are examples of the process related to the information processing method according to the above-described present embodiment can be performed by an information processing system that includes an external apparatus and the information processing apparatus according to the present embodiment.

Note that "the foregoing setting processes" or the "the foregoing setting processes and the foregoing display control processes" are processes in which the process related to the information processing method according to the present embodiment is divided for convenience. Accordingly, the process related to the information processing method according to the present embodiment, for example, "the foregoing setting processes and the foregoing display control processes," can be ascertained as one process. In addition, each of "the foregoing setting processes" and "the foregoing setting processes and the foregoing display control processes" can also be ascertained as two or more processes in accordance with any division method.

Information Processing Apparatus According to Present Embodiment

Next, an example of a configuration of the information processing apparatus according to the present embodiment capable of performing the process related to the information processing method according to the present embodiment described above will be described.

FIG. 14 is an explanatory diagram illustrating an example of an information processing system 1000 according to the present embodiment including the information processing apparatus 100 according to the present embodiment.

The information processing system 1000 includes, for example, the information processing apparatus 100, an input device 200, and a display device 300.

In addition, the information processing apparatus 100, the input device 200, and the display device 300 are each connected in a wired or wireless manner via, for example, a network 400. As the network 400, for example, a wired network such as a local area network (LAN) or a wide area network (WAN), a wireless network such as a wireless local area network (WLAN), and the Internet using a communication protocol such as Transmission Control Protocol/Internet Protocol (TCP/IP) can be exemplified. Note that in the information processing system according to the present embodiment, the information processing apparatus 100, the input device 200, and the display device 300 can each perform direct communication without being involved in the network 400.

The information processing apparatus 100 performs a process related to the information processing method according to the above-described embodiment. An example of a configuration of the information processing apparatus 100 will be described below.

As the input device 200, for example, a voice input device such as a microphone or a microphone array and any manipulation device such as a keyboard (a hardware keyboard or a software keyboard) can be exemplified. A signal generated by the input device 200, such as a voice signal including a spoken voice, is transmitted to the information processing apparatus 100 by, for example, a communication device included in the input device 200 or an external communication device connected to the input device 200.

The display device 300 displays various screens on a display screen. The information processing apparatus 100 causes the display device 300 to display the delimitation or the like set in the selected word in the text string indicated by the text string information as in the examples illustrated in FIGS. 5 to 13, for example, by transmitting a control signal including data indicating a display command or notification content to the display device 200.

As the display device 300, for example, a liquid crystal display, an organic electro-luminescence (EL) display (which is also referred to as an organic light emitting diode display (OLED)), and the like can be exemplified.

Note that the configuration of the information processing system according to the present embodiment is not limited to the example illustrated in FIG. 14.

For example, in the information processing system according to the present embodiment, the input device 200 and the display device 300 illustrated in FIG. 14 may be included in one device.

In addition, FIG. 14 illustrates an example in which the information processing apparatus 100, the input device 200, and the display device 300 are each connected to the network 400, but the information processing apparatus according to the present embodiment may include the input device 200 and the display device 300 illustrated in FIG. 14. That is, in the information processing apparatus according to the present embodiment, for example, "visual notification such as a delimitation set in a word selected in a text string indicated by text string information" realized in the information processing system 1000 (also including the configuration according to a modification example) illustrated in FIG. 14 can also be realized as being stand-alone. An application example of the information processing apparatus according to the present embodiment will be described below.

Hereinafter, an example of a configuration of an information processing apparatus according to the present embodiment will be described exemplifying the information processing apparatus 100 included in the information processing system 1000 illustrated in FIG. 14.

Figure 15:
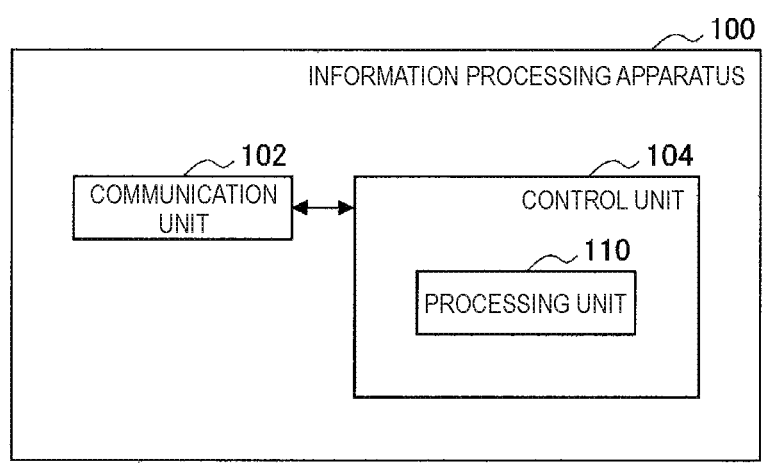
FIG. 15 is a block diagram illustrating an example of a configuration of an information processing apparatus according to the present embodiment.

FIG. 15 is a block diagram illustrating an example of a configuration of the information processing apparatus 100 according to the present embodiment. The information processing apparatus 100 includes, for example a communication unit 102 and a control unit 104.

Moreover, for example, the information processing apparatus 100 may include, a read-only memory (ROM which is not illustrated), a random access memory (RAM which is not illustrated), a storage unit (not illustrated), a manipulation unit (not illustrated) which can be manipulated by a user of the information processing apparatus 100, and a display unit (not illustrated) that displays various screens on a display screen. In the information processing apparatus 100, for example, the constituent elements are connected via a bus serving as a data transmission path.

The ROM (not illustrated) stores a program or control data such as calculation parameters which are used by the control unit 104. The RAM (not illustrated) temporarily stores a program or the like which is executed by the control unit 104.

The storage unit (not illustrated) is storage means included in the information processing apparatus 100 and stores, for example, various kinds of data such as various applications or data related to the information processing method according to the present embodiment, such as a table (or a database) or the like in which words are associated with similar sounding words. In addition, the storage unit (not illustrated) may store the text string information. Here, as the storage unit (not illustrated), for example, a magnetic recording medium such as a hard disk and a nonvolatile memory such as a flash memory can be exemplified. Moreover, the storage unit (not illustrated) may be detachably mounted on the information processing apparatus 100.

As the manipulation unit (not illustrated), a manipulation input device to be described below can be exemplified. Moreover, as the display unit (not illustrated), a display device to be described below can be exemplified.

Example of Hardware Configuration of Information Processing Apparatus 100

Figure 16:
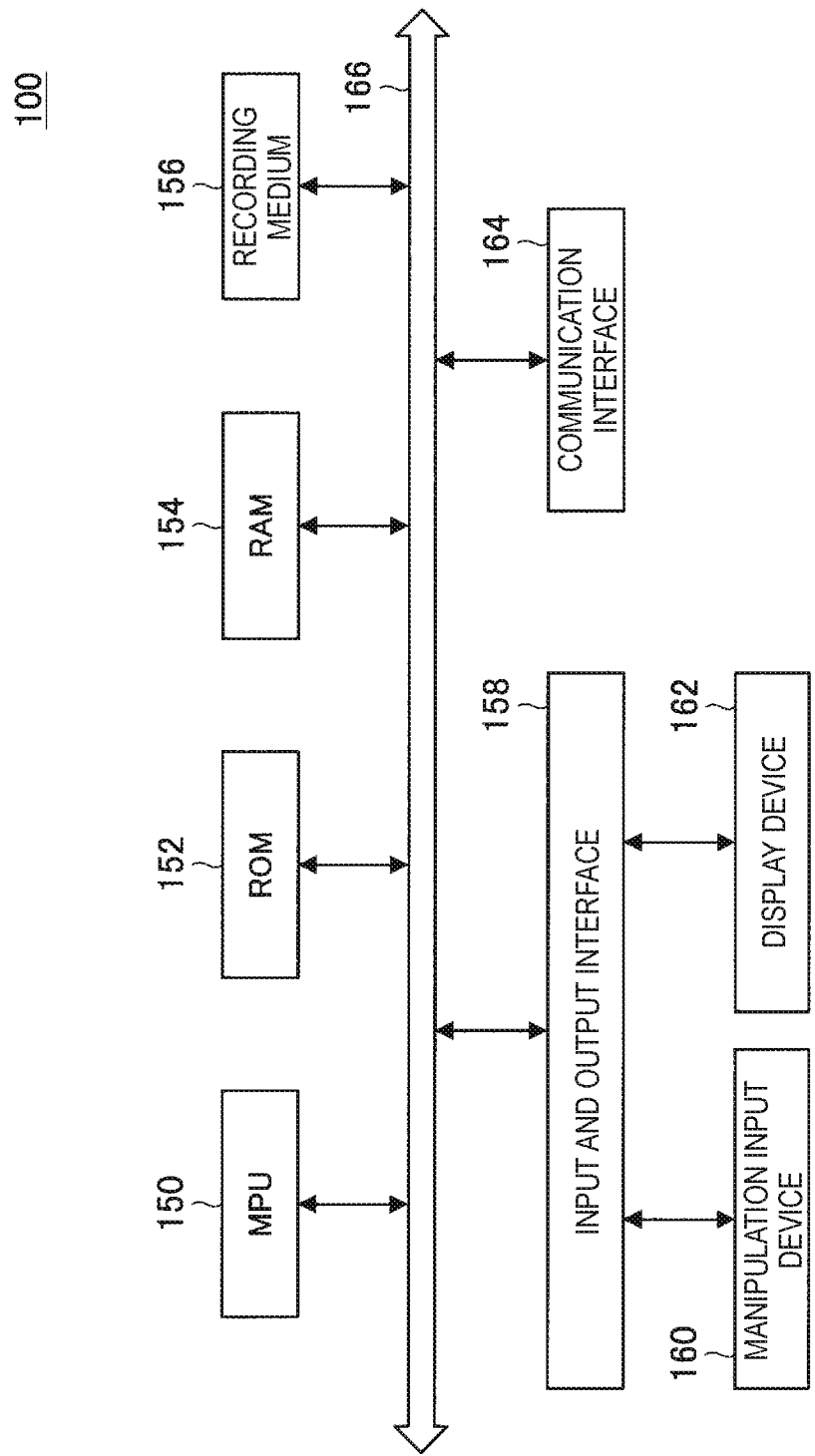
FIG. 16 is an explanatory diagram illustrating an example of a hardware configuration of the information processing apparatus according to the present embodiment.

FIG. 16 is an explanatory diagram illustrating an example of a hardware configuration of the information processing apparatus 100 according to the present embodiment. The information processing apparatus 100 includes, for example, an MPU 150, a ROM 152, a RAM 154, a recording medium 156, an input and output interface 158, a manipulation input device 160, a display device 162, and a communication interface 164. Moreover, in the information processing apparatus 100, for example, the constituent elements are connected via a bus 166 serving as a data transmission path. Further, the information processing apparatus 100 is driven by, for example, electric power supplied from an internal power supply such as a battery of the information processing apparatus 100, electric power supplied from a connected external power supply, or the like.

For example, the micro processing unit (MPU) 150 includes one or two or more processors or various processing circuits including a calculation circuit such as an MPU, and functions as the control unit 104 controlling the entire information processing apparatus 100. Moreover, the MPU 150 plays roles of, for example, the processing unit 110 to be described below in the information processing apparatus 100. Note that the processing unit 110 may include a dedicated (or general-purpose) circuit (for example, a processor different from the MPU 150) capable of realizing a process of each unit.

The ROM 152 stores a program or control data such as calculation parameters which is used by the MPU 150. For example, the RAM 154 temporarily stores a program or the like which is executed by the MPU 150.

The recording medium 156 functions as a storage unit (not illustrated) and stores, for example, various kinds of data such as various applications or data related to the information processing method according to the present embodiment, such as a table or the like in which words are associated with similar sounding words. In addition, the recording medium 156 may store the text string information. Here, as the recording medium 156, for example, a magnetic recording medium such as a hard disk and a nonvolatile memory such as a flash memory can be exemplified. Moreover, the recording medium 156 may be detachably mounted on the information processing apparatus 100.

The input and output interface 158 connects, for example, the manipulation input device 160 or the display device 162. The manipulation input device 160 functions as a manipulation unit (not illustrated) and the display device 162 functions as a display unit (not illustrated). Here, as the input and output interface 158, for example, a Universal Serial Bus (USB) terminal, a Digital Visual Interface (DVI) terminal, a High-Definition Multimedia Interface (HDMI) (registered trademark) terminal, and various processing circuits can be exemplified.

Moreover, for example, the manipulation input device 160 can be installed on the information processing apparatus 100 and is connected to the input and output interface 158 inside the information processing apparatus 100. As the manipulation input device 160, for example, a button, an arrow key, a rotary selector such as a jog dial, or a combination thereof can be exemplified.

In addition, the display device 162 is equipped on the information processing apparatus 100 and is connected to, for example, the input and output interface 158 inside the information processing apparatus 100. As the display device 162, for example, a liquid crystal display, an organic EL display, or the like can b exemplified.

In addition, it is regardless to say that the input and output interface 158 can be connected to an external device such as an external manipulation input device (for example, a keyboard or a mouse) or an external display device of the information processing apparatus 100. Moreover, the display device 162 may be, for example, a device in which display and a user manipulation are possible, such as a touch panel.

The communication interface 164 is communication means included in the information processing apparatus 100 and functions as the communication unit 102 that performs wireless or wired communication with an external device such as the input device 200 or the like or an external apparatus via a network 400 (or directly). Here, as the communication interface 164, for example, a communication antenna and a radio frequency (RF) circuit (for wireless communication), an IEEE 802.15.1 port and a transmission and reception circuit (for wireless communication), an IEEE 802.11 port and a transmission and reception circuit (for wireless communication), or a Local Area. Network (LAN) terminal and a transmission and reception circuit (for wired communication) can be exemplified. In addition, the communication interface 164 may have any configuration corresponding to the network 400.

The information processing apparatus 100 that has, for example, the configuration illustrated in FIG. 16 performs the process related to the information processing method according to the present embodiment. In addition, a hardware configuration of the information processing apparatus 100 according to the present embodiment is not limited to the configuration illustrated in FIG. 16.

For example, the information processing apparatus 100 does not have to include the communication interface 164 in a case in which communication with an external apparatus is performed via a connected external communication device.

Moreover, the communication interface 164 may be capable of performing communication with one or two or more external apparatuses in conformity with a plurality of communication schemes.

Moreover, for example, the information processing apparatus 100 does not have to include the recording medium 156, the manipulation input device 160, or the display device 162.

In addition, the information processing apparatus 100 can have, for example, a configuration in accordance with an application example of the information processing apparatus 100 to be described below.

Moreover, a part or the whole of the structural elements illustrated in FIG. 16 (or a configuration according to a modification example) may be realized by one or two or more integrated circuits (ICs).

Referring back to FIG. 15, an example of the configuration of the information processing apparatus 100 will be described. The communication unit 102 is communication means included in the information processing apparatus 100 and performs wireless or wired communication with an external device such as the input device 200 or the like or an external apparatus via a network 400 (or directly). Moreover, the communication of the communication unit 102 is controlled by, for example, the control unit 104.

Here, as the communication unit 102, for example, a communication antenna and an RF circuit or a LAN terminal and a transmission and reception circuit can be exemplified. However, the configuration of the communication unit 102 is not limited to the foregoing configuration. For example, the communication unit 102 can have a configuration corresponding to any standard capable of performing communication, such as a USB terminal and a transmission and reception circuit or have any configuration capable of communicating an external apparatus via a network 400. Moreover, the communication unit 102 may have a configuration capable of performing communication with one or two or more external apparatuses in conformity with a plurality of communication schemes.

The control unit 104 is constituted by, for example, an MPU or the like and plays a role of controlling the information processing apparatus 100 in general.

Further, the control unit 104 includes, for example, a processing unit 110, and plays a leading role of performing the process according to the information processing method of the present embodiment. Further, the control unit 104 can also perform, for example, various processes such as a text string generation process capable of generating the text string information on the basis of an input, such as a voice recognition process.

The processing unit 110 plays a leading role of performing the process related to the information processing method according to the present embodiment.

The processing unit 110 performs the foregoing setting process and sets a delimitation of a selected word in a text string indicated by text string information. The processing unit 110 sets a delimitation in the text string of the selected word, for example, by performing any of the setting process in the foregoing first example to the setting process in the foregoing fifth example.

In addition, the processing unit 110 may further perform the foregoing display control process. In a case in which the foregoing display control process is performed, the processing unit 110 causes the delimitation set with regard to the selected word in the foregoing setting process to be displayed. In addition, in a case in which the foregoing display control process is performed, the processing unit 110 can also cause conversion candidates corresponding to the set delimitation to be further displayed, for example, as illustrated in FIGS. 12 and 13.

The information processing apparatus 100 performs the process related to the information processing method according to the present embodiment in accordance with, for example, the configuration illustrated in FIG. 15. Accordingly, the information processing apparatus 100 can improve the convenience of the change in the text string in accordance with, for example, the configuration illustrated in FIG. 15.

Further, as the information processing apparatus 100 can obtain the effects obtained by performing the process according to the information processing method of the present embodiment as described above, for example, with the configuration illustrated in FIG. 15.

Further, the configuration of the information processing apparatus according to the present embodiment is not limited to the configuration illustrated in FIG. 15.

For example, in the information processing apparatus according to the present embodiment, the processing unit 110 illustrated in FIG. 15 can be installed separately from the control unit 104 (for example, can be implemented by another processing circuit).

Therefore, the configuration for implementing the process according to the information processing method of the present embodiment is not limited to the configuration illustrated in FIG. 15, and a configuration corresponding to a way of separating the process according to the information processing method of the present embodiment may be employed.

Further, for example, in a case in which communication is performed with an external apparatus through an external communication device having a similar function and configuration to those of the communication unit 102, the information processing apparatus according to the present embodiment may not include the communication unit 102.

As the present embodiment, the information processing apparatus has been described as an example, but the present embodiment is not limited to this mode. For example, the present embodiment can be applied to various apparatuses capable of performing the process related to the information processing method according to the present embodiment, such as "a computer such as a personal computer (PC) or a server," "a head-mounted display," "a glasses type wearable apparatus," "various wearable apparatuses mounted on the bodies of users for use, such as a watch type apparatus and a bracelet type apparatus," "a communication apparatus such as a smartphone," "a tablet type apparatus," "a game apparatus," and "a moving body such as a bicycle, an automobile, and an electric standing ride two-wheeled vehicle." In addition, the present embodiment can be applied to, for example, a processing IC which can be embedded in the foregoing apparatus.

In addition, the information processing apparatus according to the present embodiment may be applied to, for example, a processing system in which connection to a network (or communication between apparatuses) is assumed, such as cloud computing. As an example of the processing system that performs the process related to the information processing method according to the present embodiment, for example, "a system in which one apparatus included in the processing system performs a partial process of the process related to the information processing method according to the present embodiment and another apparatus included in the processing system performs the other process other than the partial process of the process related to the information processing method according to the present embodiment" or the like can be exemplified.

Program According to Present Embodiment

By causing a processor or the like in a computer system to execute a program (for example, a program capable of executing the process related to the information processing method according to the present embodiment, such as "the foregoing setting processes" or "the foregoing setting processes and the foregoing display control processes") causing the computer system to function as the information processing apparatus according to the present embodiment, it is possible to achieve the improvement in the convenience of the change in the text string. Here, as the computer system according to the present embodiment, a single computer or a plurality of computers can be exemplified. The computer system according to the present embodiment performs a series of processes related to the information processing method according to the present embodiment.

In addition, by causing a processor or the like in the computer system to execute a program causing the computer system to function as the information processing apparatus according to the present embodiment, it is possible to achieve the advantageous effects achieved through the process related to the information processing method according to the above-described present embodiment.

FIG. 17 is an explanatory diagram illustrating an example of a program causing a computer system to function as the information processing apparatus according to the present embodiment. FIG. 17 illustrates an example of a part of the program in a case in which the program is provided as an application programming interface (API). Note that it is needless to say that an example of the program according to the present embodiment is not limited to the example illustrated in FIG. 17.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the example in which the program causing the computer system to function as the information processing apparatus according to the present embodiment (the computer program) is provided has been described above, but in the present embodiment, a recording medium having the program stored therein can be provided together.

The above-described configuration is a configuration indicating an example of the present embodiment, and it would be understood that the above-described configuration is included in the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below (1) An information processing apparatus including:
  a processing unit configured to determine, on the basis of a word of a predetermined unit selected in a text string indicated by text string information, another word connected to the selected word and included in the text string and to set a delimitation in the text string with regard to the selected word.
(2) The information processing apparatus according to (1), in which the processing unit sets a text string including the selected word and the other word determined to be connected to the selected word, as the delimitation with regard to the selected word.
(3) The information processing apparatus according to (1) or (2), in Which the processing unit determines the other word connected to the selected word on the basis of a predetermined index of the connection.
(4) The information processing apparatus according to (3), in which the predetermined index includes the number of similar sounding words, and
  the processing unit determines the other word connected to the selected word on the basis of the number of similar sounding words with regard to the selected word.
(5) The information processing apparatus according to (4), in which the processing unit determines the other word connected to the selected word by comparing a threshold of the similar sounding words with the number of similar sounding words that sound similar to the selected word.
(6) The information processing apparatus according to any one of (3) to (5),
  in which the predetermined index includes information indicating whether a word is a shortly spoken word, and
  the processing unit determines whether the selected word is a shortly spoken word and determines the other word connected to the selected word.
(7) The information processing apparatus according to any one of (3) to (6),
  in which the predetermined index includes a cooccurrence relation, and
  the processing unit determines the cooccurrence relation with a cooccurrence word associated with the selected word and determines the other word connected to the selected word.
(8) The information processing apparatus according to (7), in which the processing unit determines the other word connected to the selected word by comparing a value indicating occurrence intensity of the cooccurrence word with a threshold of the cooccurrence relation.
(9) The information processing apparatus according to any one of (1) to (8),
  in which the processing unit sets the selected word and the other word determined to be connected as one word in a case in which the other word is determined to be connected to the selected word, and
  the processing unit determines still another word connected to the one word and included in the text string and sets a previous delimitation of the selected word.
(10) The information processing apparatus according to any one of (1) to (9), in which the processing unit further causes the delimitation set with regard to the selected word to be displayed.
(11) The information processing apparatus according to (10), in which the processing unit further causes a conversion candidate corresponding to the set delimitation to be displayed.
(12) The information processing apparatus according to (11), in which the processing unit causes a pictograph to be displayed as the conversion candidate.
(13) The information processing apparatus according to (11) or (12), in which the processing unit causes an abbreviation to be displayed as the conversion candidate.
(14) The information processing apparatus according to any one of (1) to (13), in which the text string indicated by text string information is a text string indicated by a result of voice recognition.
(15) The information processing apparatus according to any one of (1) to (14), in which the text string indicated by the text string information is a text string indicated by a result of an input to a manipulation device.
(16) An information processing method performed by an information processing apparatus, the information processing method including:
  a step of determining, on the basis of a word of a predetermined unit selected in a text string indicated by text string information, another word connected to the selected word and included in the text string and setting a delimitation in the text string with regard to the selected word.

REFERENCE SIGNS LIST 100 information processing apparatus
102 communication unit
104 control unit
110 processing unit
200 input device
300 display device
400 network
1000 information processing system

The invention claimed is:
1. An information processing apparatus comprising:
  a processing unit configured to
    determine, based on a word of a predetermined unit selected in a text string indicated by text string information, another word connected to the selected word and included in the text string, and
    set a delimitation in the text string with regard to the selected word,
  wherein the delimitation in the text string indicates a connection direction between the selected word and the other word, and
  wherein the processing unit is implemented via at least one processor.
2. The information processing apparatus according to claim 1, wherein the processing unit sets a text string including the selected word and the other word determined to be connected to the selected word, as the delimitation with regard to the selected word.

3. The information processing apparatus according to claim 1, wherein the processing unit determines the other word connected to the selected word based on a predetermined index of the connection.

4. The information processing apparatus according to claim 3,
wherein the predetermined index includes a number of similar sounding words, and
the processing unit determines the other word connected to the selected word based on the number of similar sounding words with regard to the selected word.

5. The information processing apparatus according to claim 4, wherein the processing unit determines the other word connected to the selected word by comparing a threshold of the similar sounding words with the number of similar sounding words that sound similar to the selected word.

6. The information processing apparatus according to claim 3,
wherein the predetermined index includes information indicating whether a word is a shortly spoken word, and
the processing unit determines whether the selected word is a shortly spoken word and determines the other word connected to the selected word.

7. The information processing apparatus according to claim 3,
wherein the predetermined index includes a cooccurrence relation, and
the processing unit determines the cooccurrence relation with a cooccurrence word associated with the selected word and determines the other word connected to the selected word.

8. The information processing apparatus according to claim 7, wherein the processing unit determines the other word connected to the selected word by comparing a value indicating occurrence intensity of the cooccurrence word with a threshold of the cooccurrence relation.

9. The information processing apparatus according to claim 1,
wherein the processing unit sets the selected word and the other word determined to be connected as one word in a case in which the other word is determined to be connected to the selected word, and
the processing unit determines still another word connected to the one word and included in the text string and sets a previous delimitation of the selected word.

10. The information processing apparatus according to claim 1, wherein the processing unit further causes the delimitation set with regard to the selected word to be displayed.

11. The information processing apparatus according to claim 10, wherein the processing unit further causes a conversion candidate corresponding to the set delimitation to be displayed.

12. The information processing apparatus according to claim 11, wherein the processing unit causes a pictograph to be displayed as the conversion candidate.

13. The information processing apparatus according to claim 11, wherein the processing unit causes an abbreviation to be displayed as the conversion candidate.

14. The information processing apparatus according to claim 1, wherein the text string indicated by text string information is a text string indicated by a result of voice recognition.

15. The information processing apparatus according to claim 1, wherein the text string indicated by the text string information is a text string indicated by a result of an input to a manipulation device.

16. An information processing method performed by an information processing apparatus, the information processing method comprising:
determining, based on a word of a predetermined unit selected in a text string indicated by text string information, another word connected to the selected word and included in the text string and setting a delimitation in the text string with regard to the selected word,
wherein the delimitation in the text string indicates a connection direction between the selected word and the other word.

* * * * *